July 19, 1955 H. E. CANN, SR., ET AL 2,713,248
REFRIGERATION CABINET
Filed June 11, 1952 4 Sheets-Sheet 1

Inventors:
Harry E. Cann, Sr.
Merrill B. Cann
by their Attorneys
Howson & Howson

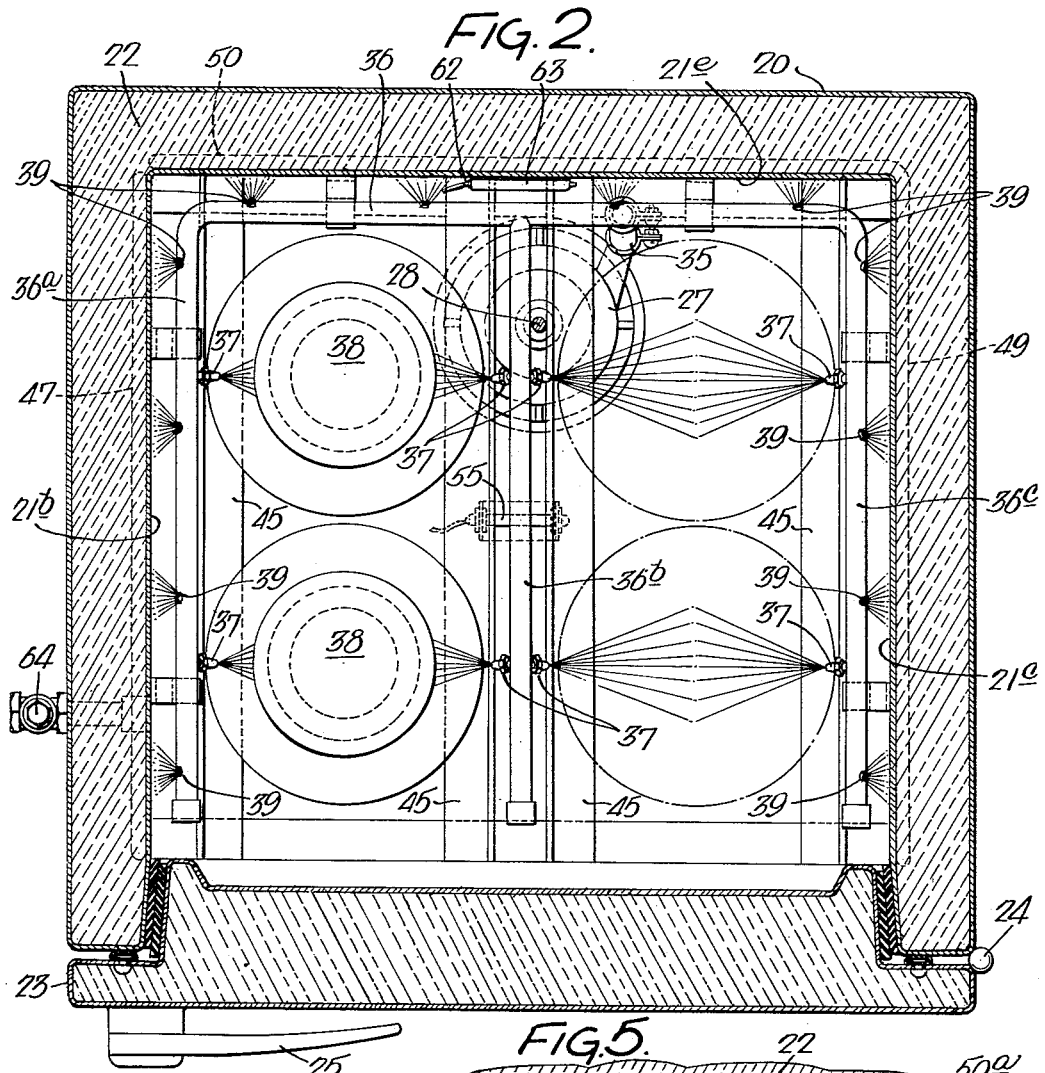
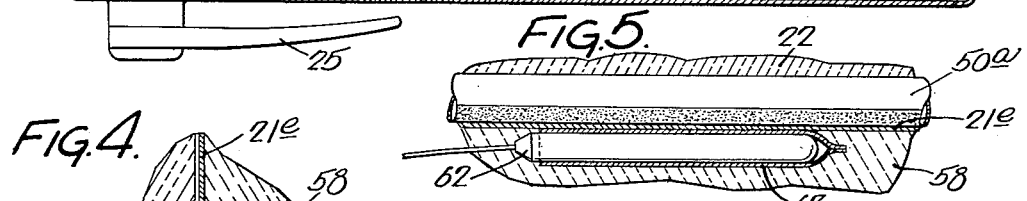
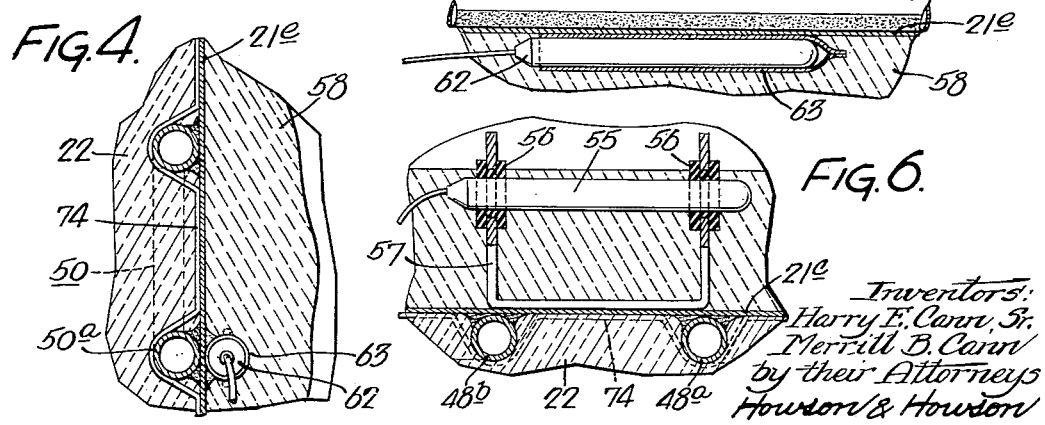

July 19, 1955

H. E. CANN, SR., ET AL 2,713,248

REFRIGERATION CABINET

Filed June 11, 1952

*Inventors:*
*Harry E. Cann, Sr.*
*Merrill B. Cann*
*by their Attorneys*
*Howson & Howson*

July 19, 1955      H. E. CANN, SR., ET AL      2,713,248
REFRIGERATION CABINET

Filed June 11, 1952                                              4 Sheets-Sheet 4

Inventors:
Harry E. Cann Sr.
Merrill B. Cann
by their Attorneys
Howson & Howson

United States Patent Office 2,713,248
Patented July 19, 1955

2,713,248

REFRIGERATION CABINET

Harry E. Cann, Sr., and Merrill B. Cann, West Chester, Pa., assignors to Esco Cabinet Company, West Chester, Pa., a corporation of Pennsylvania Application June 11, 1952, Serial No. 292,894

9 Claims. (Cl. 62—4)

This invention relates to refrigerators and more particularly to an improved milk cooler of the cabinet type intended to receive a plurality of standard milk cans.

The present invention is primarily directed to an improved cycle of operation for a milk can cooler in which both the floor and the side walls are provided with closely contacting refrigerant coils so that an ice wall is formed on the bottom and three sides of the cabinet. In milk coolers heretofore constructed, the time required to cool the milk after the warm cans have been inserted in the cooler has been excessively long. As is well known, the proper control of bacteria growth is dependent upon the temperature of the milk, and it is therefore extremely important to the dairyman that the milk be cooled to the desired temperature in the shortest possible time. Many types of cooling cabinets for milk cans have been proposed but none of these is capable of the efficient and rapid cooling properties found in our present construction because we have combined features in the fabrication of the cabinet with a particular operating cycle which give unexpected and amazingly good results.

The invention comprises essentially the provision of a liquid pump which pumps water from the sump of the cabinet not only over the cans themselves but also against three walls of the cabinet. The refrigerant coils are located in back of the three vertical walls so that the spray from the water manifold freezes on these walls to provide a layer of ice thereon. When the cans of warm milk are placed in the cabinet, the temperature of the water pumped through the manifold is initially relatively high because it is heated by the milk. This high temperature water when sprayed against the walls strips the ice from the walls within a matter of seconds, thus permitting the water to be cooled directly from the three side walls and not requiring it to be cooled through the insulation on the walls that would otherwise be present due to the layer of ice.

The cycle of operations of the pump, the compressor, and the refrigerant valve is so controlled and arranged that the dairyman is enabled to obtain maximum cooling in the shortest possible time regardless of the number of cans that may be placed in the cabinet.

A primary object of the invention therefore is to provide a milk can cooling cabinet having extremely efficient cooling capacity.

A further object of the invention is to provide in a milk can cooling cabinet a layer of ice on preferably three walls of the cabinet and a manifold directed to spray relatively warm water onto these three walls whereby the ice is stripped from the walls long before appreciable melting of the ice takes place.

A further object of the invention is to provide an improved operating cycle and control system for a milk can cooling cabinet.

A further object of the invention is to provide an improved location and installation for the temperature responsive bulb which controls the compressor.

A further object of the invention is to provide an improved location and installation for the temperature responsive bulb which controls a valve in the refrigerant line.

Further objects will be apparent from the specification and drawings in which:

Fig. 2 is a top sectional view of the structure of Fig. 1 as seen at 2—2 of Fig. 1;

Fig. 4 is a fragmentary sectional detail as seen at 4—4 of Fig. 1;

Fig. 5 is a fragmentary sectional detail as seen at 5—5 of Fig. 1;

Fig. 6 is a fragmentary sectional detail as seen at 6—6 of Fig. 3;

Figure 1:
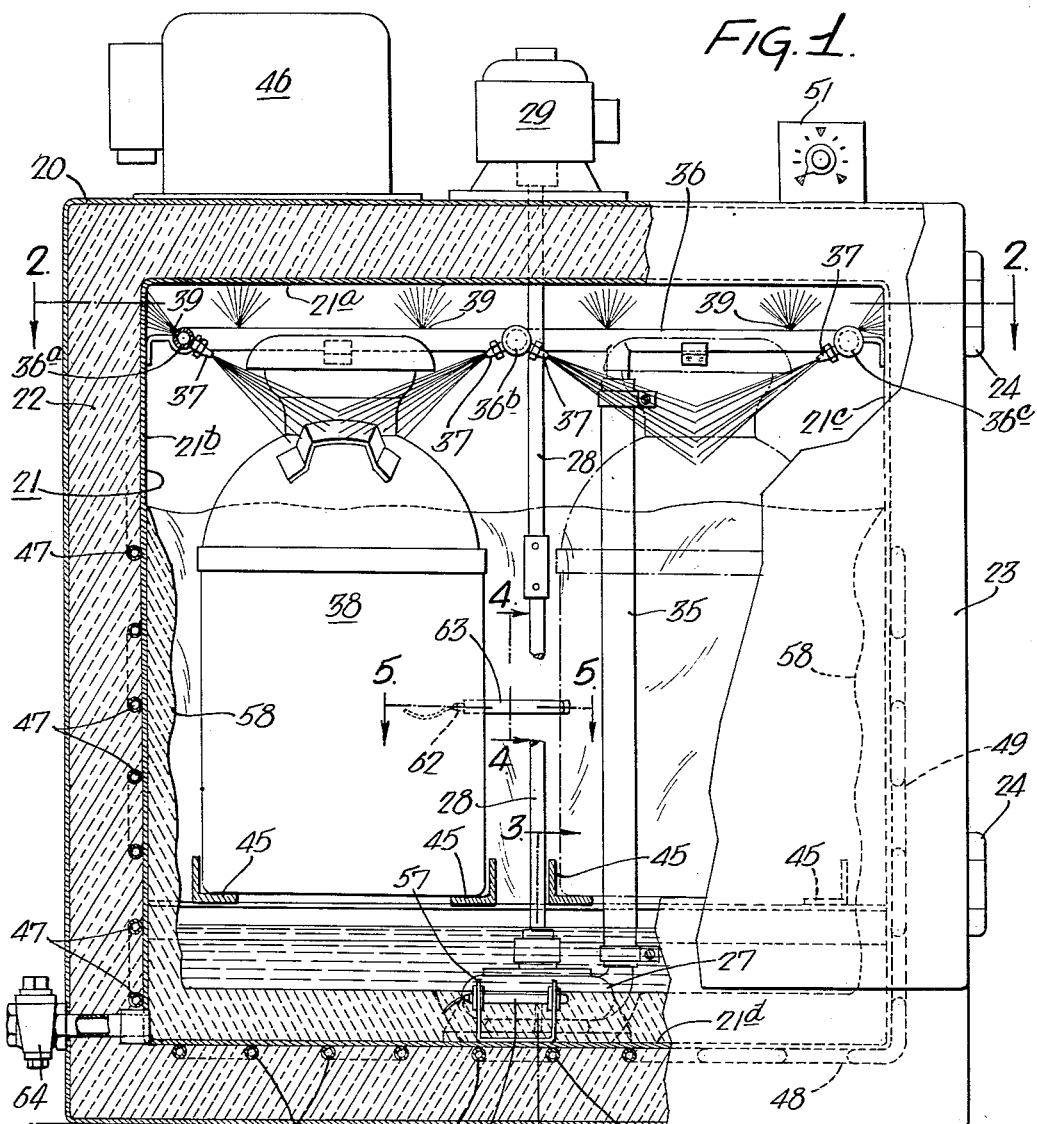
Fig. 1 is a front view of our improved milk can cooling cabinet.

Referring now more particularly to the drawings, a preferred embodiment of our invention as shown in Figs. 1–6 is provided with an outer shell 20 and inner shell 21 between which suitable insulating material 22 is packed in the usual manner. The cabinet also has a front door 23 having hinges 24, 24 and a latch handle 25.

Figure 3:
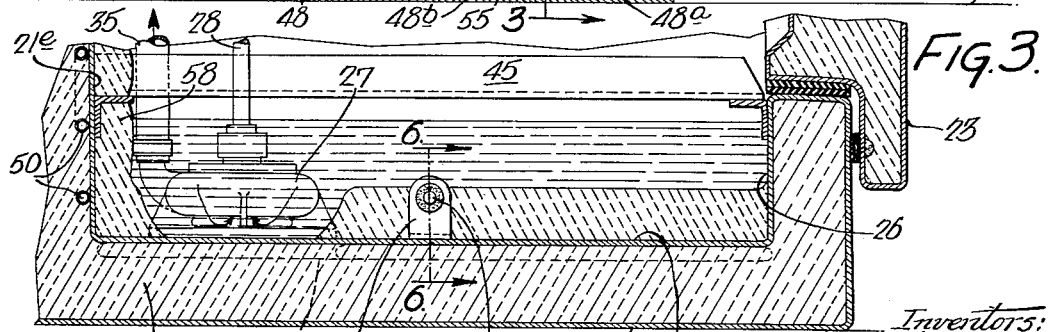
Fig. 3 is a fragmentary sectional detail as seen at 3—3 of Fig. 1.

The inner shell or lining 21 comprises a top 21a, sides 21b, 21c, a bottom 21d, and a back wall 21e. A sump or reservoir 26 is conveniently provided above the bottom 21d as shown in Fig. 3 and the sump may be formed separately from the top and sides of the cabinet. A centrifugal pump 27 is mounted in the sump 26 and driven through a vertical shaft 28 secured to an electric motor 29 on the top of the cabinet. The discharge from pump 27 is through a conduit 35 which is in turn connected to an elevated manifold assembly 36. The manifold 36 has three branches 36a, 36b, and 36c which carry suitable orifices 37 directed to shower jets of water onto the milk cans 38, 38. In addition to the orifices 37, 37 in the manifold 36, we provide a plurality of outwardly facing nozzles or orifices 39, 39 from which liquid pumped through the manifold is discharged directly onto the three walls 21b, 21c, and 21e as shown in Fig. 2.

The cabinet shown in the present drawings is designed to accommodate four conventional milk cans 38 which may be supported in the cabinet on channel iron racks 45, 45 readily accessible through the cabinet door 23. It will be understood of course that the invention may be applied to larger or smaller milk can cooling cabinets and is not limited to refrigerators of this type since it may be applied wherever it is desired to rapidly cool objects other than milk cans.

The refrigeration system used in the present cabinet is of standard construction and the compressor is denoted generally by the numeral 46 in Fig. 1. The coils through which the refrigerant is pumped are preferably connected in series so that the refrigerant first enters coils 47 which are conductively bonded to the inside of wall 21b. From thence the refrigerant is pumped through the series of coils 48 which are likewise secured to the under surface of the bottom 21d of the sump. From thence the refrigerant flows into coils 49 and 50 in back of walls 21c and 21e respectively. In larger sizes, it may be desirable to arrange for variations in the flow of refrigerant through the coils and they may be connected in pairs or in any suitable manner consistent with good refrigeration practice. The important feature of the present construction resides in the fact that the coils are bonded in back of at least one vertical wall and the bottom of the cabinet so that there is a smooth inside surface on which a layer of ice may freeze.

The motor 29 for the pump is controlled through a time switch 51 which is shown schematically in Fig. 1 and this switch may be selectively set so that the motor and pump 27 will operate for only a predetermined period of time. The compressor 46 of the refrigeration system however is responsive to temperature only and the compressor is started and stopped by means of a conventional expansion bulb 55 which is mounted by means of rubber grommets 56, 56 in a U-shaped bracket 57 secured to the bottom 21d of the cabinet. The height of the bulb 55 from the bottom of the sump 21d is the critical factor in controlling the thickness of the layer of ice 58 which will be formed on all three of the vertical inside walls. As will be explained hereafter, it is also important that when the water in the sump changes to ice it is built up evenly around the bulb 55. Therefore, we position the bracket 57 and the bulb 55 centrally with regard to two parallel lengths 48a and 48b of the refrigerant coil 48. In this way, the ice built up around the bulb is kept even from one end to the other thereof thus permitting very close control of the compressor.

As is customary in refrigerator systems, a thermostatically controlled valve 60 (Figs. 7–11) is placed in the refrigerant line between the heat exchanger 61 and the evaporator coils 47—50. The valve 60 is responsive to a second temperature bulb 62 located on the back wall 21e of the cabinet in a position where it will be directly affected by the temperature of the water that is pumped through manifold 36 as well as the temperature of the refrigerant in the coils 50 of the rear evaporator section. Fig. 4 shows the manner in which the bulb 62 is installed in a shell 63 which is bonded to the rear wall 21e directly opposite one of the horizontal passes 50a of the rear coil system 50.

Figure 7:
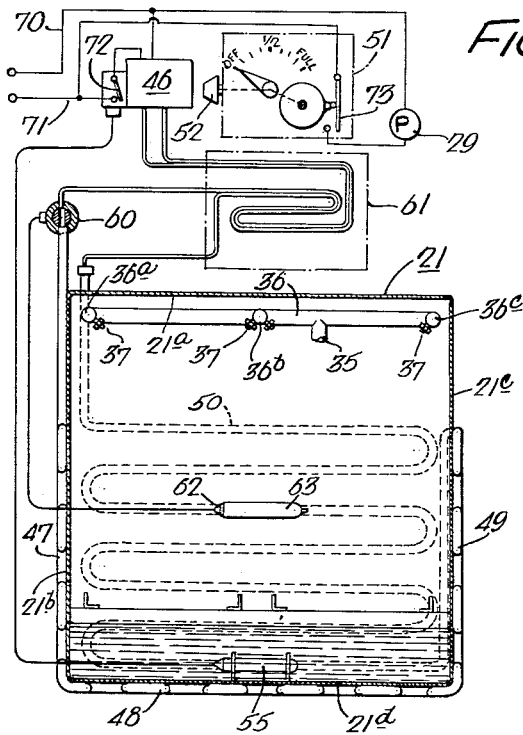
Figs. 7–11 are schematic views showing the relative conditions existing in the cooling cabinet and its associated apparatus during the operating cycle.
Figure 8:
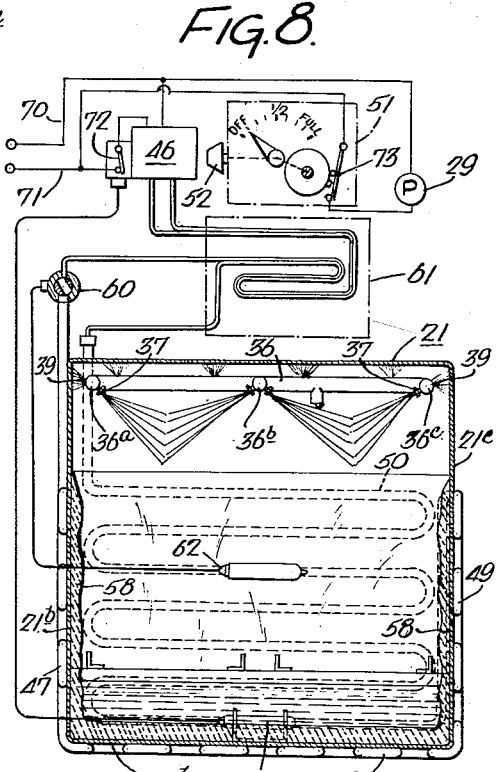

Referring now to Figs. 7–11 the operating cycle for the evaporator valve, the pump, and the compressor will be described in detail. When the cabinet is initially installed, the sump drain valve 64 is closed and the sump is filled with about six inches of water. Fig. 7 illustrates the cabinet in this condition before the current has been turned on through leads 70 and 71 to start the compressor 46 by closing switch 72. To condition the cabinet initially, the farmer not only starts the compressor 46 by throwing a suitable switch (not shown) but he will also set the timer 51 by means of a knob 52 to start the pump 27 so that water will be sprayed onto the side walls of the cabinet to form a sheet of ice thereon approximately 1½" thick. The time for which the pump will run depends upon the position at which the farmer sets the time control mechanism. In a four can cooling cabinet, the timer will ordinarily be marked for ¼ load, ½ load, ¾ load, and full load corresponding to 1, 2, 3, and 4 cans respectively. Assuming that the farmer will place two cans of milk in the cooler per milking so that a four can cooler would be adequate for one day's production, the farmer then sets the timer to half load which causes the pump motor 29 to operate for approximately four hours. Fig. 8 shows the relative condition of the cabinet just before the timer 51 opens the circuit to pump motor 29 through the switch 73. In this condition the evaporator valve 60 has changed from the fully open position shown in Fig. 7 to a nearly closed position shown in Fig. 8 because the control bulb 62 for the evaporator valve is now buried in the layer of ice on the rear wall 21e. Likewise, the ice wall has been built up on the three inner vertical walls to the desired thickness which is between one and two inches. Ice has likewise formed in the sump and is approximately the same thickness or a little more than the thickness of the ice on the walls. In this condition, the top of the sump ice layer will be at or near the bottom of the bulb 55 as shown.

Figure 9:
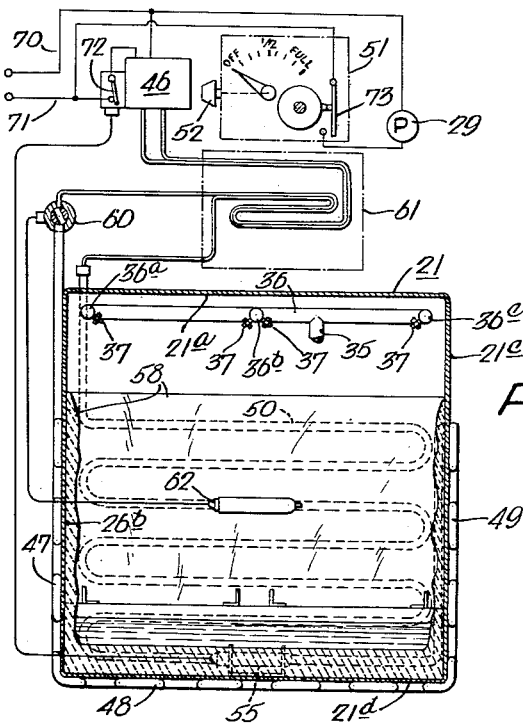

After the pump motor 29 is stopped by the timer 51 at the end of four hours (for half load), the compressor 46 continues to operate until the layer of ice in the sump has built up to completely enclose the bulb 55 as shown in Fig. 9. At this point, the compressor 46 is stopped when switch 72 opens under control of bulb 55. The cabinet is now ready to receive cans of warm milk. However, natural heat losses through the cabinet walls will eventually melt some of the ice layer in the sump until the bulb 55 is partially exposed or until the temperature rises approximately ½° F. above the shut-off temperature. The compressor 46 then operates again for about seven to ten minutes per hour to maintain the ice on the walls and to build up the ice over the bulb 55. This condition occurs regardless of whether the cabinet is empty or full.

Figure 10:
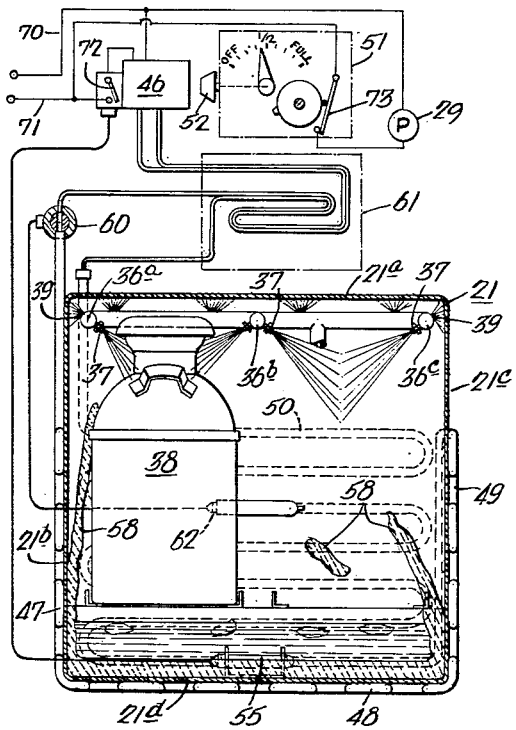

Now when the farmer places, for example, two cans of warm milk having a temperature of about 90° F. in the cabinet, he sets the timer 52 so that the timer dial shows half load. The pump 27 is then driven by pump motor 29 and the water in the sump is sprayed both over the cans of warm milk and against three of the inside walls as shown in Fig. 10. Formation of ice in the vicinity of the pump 27 is prevented by shortening the coil lengths 48a and 48b so that no heat is absorbed in that area, as clearly shown in Fig. 3.

Fig. 10 shows the system soon after the pump has started but before bulb 55 has closed the switch 72 to start the compressor 46. It will be noted that the warm water sprayed on the side and rear walls from manifold 36 has completely stripped the ice from these walls so that the ice either falls into the sump water in cakes or may for a short time lean against the cans of milk. This is an especially important feature in obtaining the improved efficiency of our present cabinet. Not only is the warm water washed directly over the walls in closest proximity to the evaporator coils without any intermediate insulation formed by an ice layer, but in addition, the cooling surface of the ice itself is substantially doubled because both sides of the layer or the chunks of stripped ice are in contact with the warm water. In about 15 minutes after the timer is set, the warm water has sufficiently melted the ice layer in the sump above bulb 55 so that the compressor switch 72 is closed. The time at which the compressor starts may vary from 15 minutes to half an hour after the pump starts, but in this interim the water has reached its maximum temperature of about 43° F. thus melting all the ice in the cabinet. Approximately one hour after the pump was started, the milk is cooled to a temperature below 50° F. Both the compressor and the pump continue to operate so that the ice begins to build up inside the cabinet as soon as the temperature of the water has dropped to approximately 39°. During this part of the operation, bulb 62 maintains the evaporator valve 60 in a completely open position to insure maximum flow of refrigerant. As the new layer of ice gradually builds up first on the left hand cabinet wall 21b, then in the sump 21d, then on the right hand wall 21c and the rear wall 21e, the evaporator valve 60 is gradually turned to a partially closed position until the compressor stops.

Figure 11:
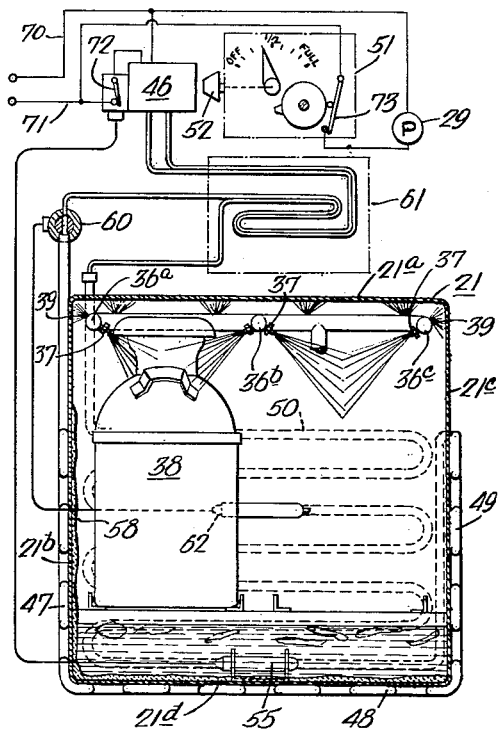

Fig. 11 shows the general arrangement of the elements of our cabinet as would be seen after all the old ice layer has been stripped from the side walls and the ice in the sump melted. The new layer is just starting to form on the left wall 21b and in the bottom of the sump 21d. After four hours (for half load) the timer 51 opens the circuit to pump control motor 29 by means of switch 73 whereupon the pump stops and no more ice can form on the walls. There is however a rather sharp decrease in the temperature of the refrigerant so that the ice in the sump rapidly builds up to enclose bulb 55 as shown in Fig. 9, whereupon the compressor stops. The cabinet is then ready to receive more warm milk cans. The evaporator coils 47—50 are held in place by strips of sheet metal 74 (Fig. 6) which are spot welded to the inside liner of the cabinet and the coils are held against the inner cabinet walls with a metallic bonding compound in order to obtain maximum heat transfer.

Figure 12:
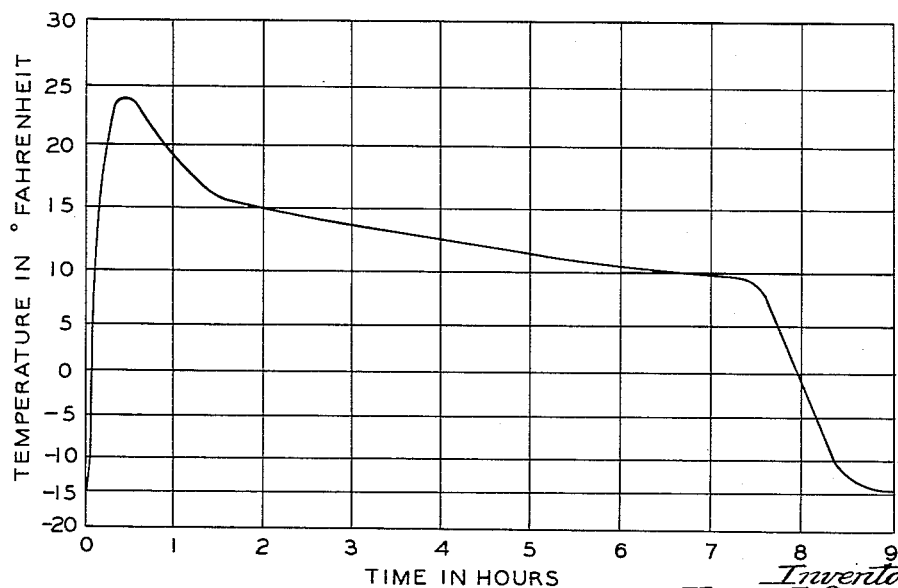
Fig. 12 is a chart showing the temperature of the refrigerant plotted against the time of the cycle.

The highly efficient design described hereabove gives a rather interesting time temperature curve as shown in Fig. 12 from which it will be seen that the heat from the water and the warm cans is very quickly absorbed by the refrigerant. It will be understood that the setting of the timer 51 can be manually controlled to shut off the pump 27 over a wide range of time, for example, 3½ to 8½ hours, and the location of the bulb 55 has been so selected that it controls the compressor accurately and without hunting or without the possibility that the sump should completely freeze over. Also, the positioning of the bulb 62 which controls the evaporator valve 60 is of great importance since it is not only sensitive to the refrigerant temperature, but being located on the inside of the wall, it is likewise controlled by the presence of the ice layer on the back wall and of course when the ice layer is stripped from the wall, the bathing of the bulb with warm water greatly increases the effective and efficient operation of the valve 60 and also steadies the action thereof to prevent hunting. It therefore is possible to provide maximum cooling rate and efficiency with a relatively limited and controlled ice layer on the inside of the cabinet.

Having thus described our invention, we claim:

1. A refrigeration cabinet comprising three insulated vertical liner walls, a top connecting said vertical walls, a door forming the fourth vertical wall, a bottom connecting said vertical walls, means including a rack in vertical spaced relation to said bottom for supporting objects to be cooled thereby forming a sump in the bottom below said objects, means including a pump and conduit for supplying liquid from the sump and flushing it over said three cabinet liner walls and over objects supported on said rack, an evaporator coil mounted in close coupled freezing relation to each of the vertical liner walls, a second evaporator coil mounted in close coupled freezing relation to the bottom of the cabinet, means including a compressor for supplying refrigerant to said coils, and temperature responsive means mounted in the sump in predetermined vertical spaced relation to the bottom evaporator coil, said temperature responsive means being operatively connected to said compressor to control the starting and stopping thereof.

2. A refrigeration cabinet comprising a closed container having vertically extending wall portions and a bottom wall portion, said bottom wall portion including a sump for containing water, means for supporting objects to be cooled within said cabinet, means associated with said sump for impelling water from said sump to other portions of the interior of said container, said means including a conduit having outlets directed toward an upper part of a vertically extending wall portion to flush said wall portion, refrigerant circulating conduit means mounted in closely coupled freezing relation to said flushed wall portion to freeze liquid flushed thereover, and means for passing refrigerating liquid through said refrigerant circulating conduit means to freeze liquid on said vertical wall portion, whereby water first flushed against said wall portion operates to remove into said sump ice previously formed against said wall portion, and water flushed against said wall portion in continued operation is frozen to form a fresh layer of ice against said vertical wall portion as the operation of cooling and flushing progresses toward completion.

3. A refrigeration cabinet comprising a closed container having vertically extending wall portions and a bottom wall portion, said bottom wall portion including a sump for containing water, means for supporting objects to be cooled within said cabinet, means associated with said sump for impelling water from said sump to other portions of the interior of said container, said means including a conduit having outlets directed toward an upper part of a vertically extending wall portion and other outlets directed toward objects supported within said cabinet to flush said wall portion and said objects, refrigerant circulating conduit means mounted in closely coupled freezing relation to said flushed wall portion to freeze liquid flushed thereover, and means for passing refrigerating liquid through said refrigerant circulating conduit means to freeze liquid on said vertical wall portion, whereby water first flushed against said wall portion operates to remove into said sump ice previously formed against said wall portion, and water flushed against said wall portion in continued operation is frozen to form a fresh layer of ice against said vertical wall portion as the operation of cooling and flushing progresses toward completion.

4. A refrigeration cabinet comprising a closed container having vertically extending wall portions and a bottom wall portion, said bottom wall portion including a sump for containing water, means for supporting objects to be cooled within said cabinet, means associated with said sump for impelling water from said sump to other portions of the interior of said container, said means including a conduit having outlets directed toward an upper part of a vertically extending wall portion to flush said wall portion, refrigerant circulating conduit means mounted in closely coupled freezing relation to said flushed wall portion to freeze liquid flushed thereover, refrigerant circulating conduit means mounted in closely coupled freezing relation to said bottom wall portion to freeze liquid therein, and means for passing refrigerating liquid through said refrigerant circulating conduit means to freeze liquid on said vertical wall portion and said bottom wall portion, whereby water first flushed against said wall portion operates to remove into said sump ice previously formed against said wall portion, and water flushed against said wall portion in continued operation is frozen to form a fresh layer of ice against said vertical wall portion and said bottom wall portion as the operation of cooling and flushing progresses toward completion.

5. A refrigeration cabinet comprising a closed container having vertically extending wall portions and a bottom wall portion, said bottom wall portion including a sump for containing water, means for supporting objects to be cooled in said cabinet, means associated with said sump for impelling water from said sump to other portions of the interior of said container, said means including a conduit having outlets directed toward an upper part of a vertically extending wall portion and other outlets directed toward objects supported within said cabinet to flush said wall portion and said objects, refrigerant circulating conduit means mounted in closely coupled freezing relation to said flushed wall portion to freeze liquid flushed thereover, refrigerant circulating conduit means mounted in closely coupled freezing relation to said bottom wall portion to freeze liquid therein, means for passing refrigerating liquid through said refrigerant circulating conduit means to freeze liquid on said vertical wall portion and said bottom wall portion, a thermostat spaced from said bottom wall portion within the liquid-containing space of said sump, and means controlled by said thermostat to control the refrigerating action of said cabinet, whereby water first flushed against said vertical wall portion operates to remove into said sump ice previously formed against said vertical wall portion, and water flushed against said vertical wall portion in continued operation is frozen to form a fresh layer of ice against said vertical wall portion and against said bottom wall portion as the operation of cooling and flushing progresses toward completion.

6. A refrigeration cabinet comprising a closed container having vertically extending wall portions and a bottom wall portion, said bottom wall portion including a sump for containing water, means for supporting objects to be cooled within said cabinet, means associated with said sump for impelling water from said sump to other portions of the interior of said container, said means including a conduit having outlets directed toward an upper part of a vertically extending metal wall portion to flush said wall portion, refrigerant circulating metal conduit means bonded in freezing relation to said flushed wall portion to freeze liquid flushed thereover, and means for passing refrigerating liquid through said refrigerant circulating conduit means to freeze liquid on said vertical wall portion, whereby water first flushed against said wall portion operates to remove into said sump ice previously formed against said wall portion, and water flushed against said wall portion in continued operation is frozen to form a fresh layer of ice against said vertical wall portion as the operation of cooling and flushing progresses toward completion.

7. A refrigeration cabinet comprising a closed container having vertically extending wall portions and a bottom wall portion, said bottom wall portion including a sump for containing water, means for supporting objects to be cooled within said cabinet, means associated with said sump for impelling water from said sump to other portions of the interior of said container, said means including a conduit having outlets directed toward an upper part of a vertically extending wall portion to flush said wall portion, refrigerant circulating conduit means mounted in closely coupled freezing relation to said flushed wall portion to freeze liquid flushed thereover, means for passing refrigerating liquid through said refrigerant circulating conduit means to freeze liquid on said vertical wall portion, a thermostat in close relationship with the wall portion coupled with said refrigerant circulating conduit means controlled by said thermostat for reducing the rate of flow of refrigerant through said refrigerant circulating conduit as the temperature of said wall is lowered, a second thermostat within said cabinet, and means controlled by said second thermostat for terminating the refrigerating action, whereby water first flushed against said wall portion operates to remove into said sump ice previously formed against said wall portion, and water flushed against said wall portion in continued operation is frozen to form a fresh layer of ice against said vertical wall portion as the operation of cooling and flushing progresses toward completion.

8. A refrigeration cabinet comprising a closed container having vertically extending wall portions and a bottom wall portion, said bottom wall portion including a sump for containing water, means for supporting objects to be cooled within said cabinet, means associated with said sump for impelling water from said sump to other portions of the interior of said container, said means including a conduit having outlets directed toward an upper part of a vertically extending wall portion to flush said wall portion, refrigerant circulating conduit means mounted in closely coupled freezing relation to said flushed wall portion to freeze liquid flushed thereover, and means for passing refrigerating liquid through said refrigerant circulating conduit means to freeze liquid on said vertical wall portion, and a timer for controlling the duration of operation of said impelling means, whereby water first flushed against said wall portion operates to remove into said sump ice previously formed against said wall portion, and water flushed against said wall portion in continued operation is frozen to form a fresh layer of ice against said vertical wall portion as the operation of cooling and flushing progresses toward completion.

9. A refrigeration cabinet comprising a closed container having vertically extending wall portions and a bottom wall portion, said bottom wall portion including a sump for containing water, means for supporting objects to be cooled within said cabinet, means associated with said sump for impelling water from said sump to other portions of the interior of said container, said means including a conduit having outlets directed toward an upper part of a vertically extending wall portion and other outlets directed toward objects supported within said cabinet to flush said wall portion and said objects, refrigerant circulating conduit means bonded in freezing relation to said flushed wall portion to freeze liquid flushed thereover, refrigerant circulating conduit means bonded in freezing relation to said bottom wall portion to freeze liquid therein, means for passing refrigerating liquid through said refrigerant circulating conduit means to freeze liquid on said vertical wall portion and said bottom wall portion, a thermostat in close relationship with the wall portion bonded to said refrigerant circulating conduit means controlled by said thermostat for reducing the rate of flow of refrigerant through said refrigerant circulating conduit as the temperature of said wall is lowered, a second thermostat within said cabinet spaced from said bottom wall portion within the liquid-containing space of said sump, and means controlled by said second thermostat to control the refrigerating action of cabinet, whereby water first flushed against said vertical wall portion operates to remove into said sump ice previously formed against said vertical wall portion, and water flushed against said vertical wall portion in continued operation is frozen to form a fresh layer of ice against said vertical wall portion and against said bottom wall portion as the operation of cooling and flushing progresses toward completion.

References Cited in the file of this patent

UNITED STATES PATENTS

| Number | Name | Date |
|---|---|---|
| 2,380,901 | Chamberlain | July 31, 1945 |
| 2,512,066 | Linfor | June 20, 1950 |
| 2,557,252 | Bannister | June 19, 1951 |
| 2,608,836 | Pusey | Sept. 2, 1952 |
| 2,610,035 | Wennlund | Sept. 9, 1952 |
| 2,661,607 | Markley | Dec. 8, 1953 |